March 26, 1957     J. COHEN     2,786,477

SIDEBURN CUTTING GAUGE

Filed Nov. 3, 1954

Inventor
JACOB COHEN

United States Patent Office 2,786,477
Patented Mar. 26, 1957

2,786,477
SIDEBURN CUTTING GAUGE
Jacob Cohen, Chicago, Ill.

Application November 3, 1954, Serial No. 466,560

1 Claim. (Cl. 132—45)

This invention relates to a sideburn gauge usable with the head of a person in order to facilitate the cutting of the hair on the head of the person.

The instant invention concerns a device for implementing the cutting of sideburns on a person's head and is intended for use by either an individual owner or a barber. The principal purpose of the invention is to provide a device which enables the sideburns on each side of a person's head to be cut at the same level.

An object of this invention is to provide a device which will readily permit even cutting of the sideburns on the head of the wearer.

A more specific object of this invention is to provide centering the leveling means for positioning the U-shaped member in proper position with relation to the head of a wearer.

A further object of this invention is to provide gauge means at the terminal ends of said U-shaped member in order to facilitate even cutting of sideburns when the member is on the head of a person.

A still further object of this invention is to provide a strap pivotally mounted on the U-shaped member in order that the U-shaped member may be firmly positioned on the head of the wearer.

And yet another object of this invention is to provide an apparatus to facilitate cutting of sideburns which is highly simple and economical to manufacture.

In accordance with the general features of this invention, there is provided in a device for level cutting of sideburns on the head of a person, a generally U-shaped member for embracing the head of a person with the bight of the U at the top and the legs extending downwardly therefrom, each leg having gauge means for predetermining the point of cut of the sideburn and centering means on the bight for horizontally aligning the gauge means so as to be equidistant with respect to a point in the medial plane on the top of the person's head.

Another feature of the invention relates to the gauge means wherein each terminal leg is progressively calibrated in the same manner and each terminal leg has a self sustained member slidably mounted thereon for setting same at a predetermined point.

Still another feature of the invention relates to the centering means comprising a bubble type level.

Other objects and features of the invention may more fully appear from the following detailed description taken in connection with the accompanying drawings which illustrate an embodiment thereof and in which.

As shown on the drawings.

Figure 1:
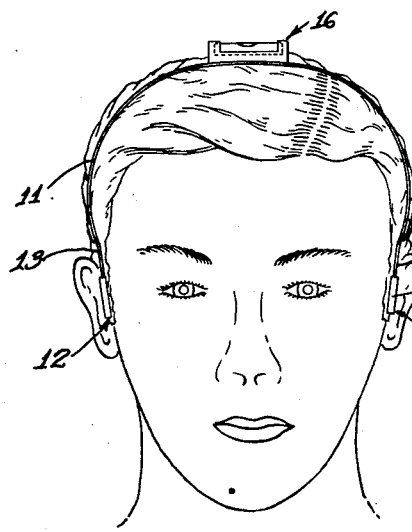
Figure 1 is an elevational view of my novel sideburn gauge illustrating how the sideburn gauge appears when mounted on the head of a person.
Figure 2:
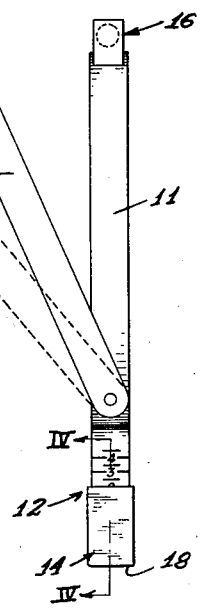
Figure 2 is a side elevational view of my novel sideburn gauge showing in more detail and by dotted lines the pivotally mounted second strap which is adapted to support the sideburn gauge from the rear of the head.
Figure 3:
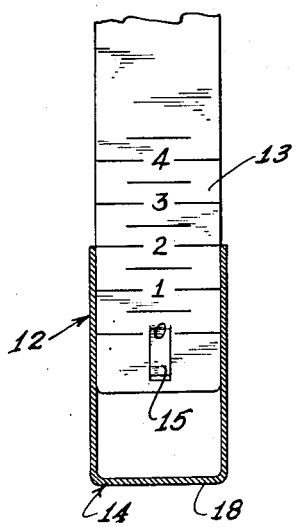
Figure 3 is a fragmentary enlarged elevational view partly in cross section showing the detail of the gauge means.
Figure 4:
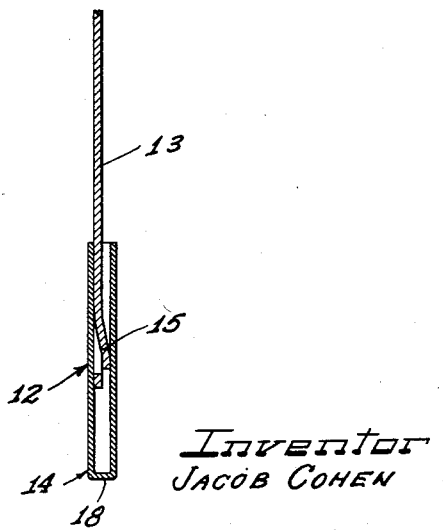
Figure 4 is an enlarged fragmentary cross sectional view taken along the lines IV—IV of Figure 2.

The reference character 10 designates generally my novel sideburn gauge assembly which has as a part thereof a generally U-shaped member 11 which is preferably made of spring steel or of other suitable material.

On each terminal end of the U-shaped member 11 is positioned identical gauge means 12—12. Each of the end portions 13—13 of the U-shaped member 11 are scaled in an identical manner. Fitted over the end portions 13—13 is a member or cap 14—14 which may be slidably moved in relation to the end portion. The caps 14 are maintained on the end portions 13 by virtue of the resilient tabs 15 which are deformed out of the material or wall of the end portions 13—13. Each of these tabs are slightly sprung as the cap is passed over them and as a consequence the tabs are constantly under tension thereby enabling the tabs to be maintained on the end portions of the U-shaped member.

Suitably secured by glue, rivets or the like at the top or the bight of the U-shaped member equidistant from the terminal ends 13—13 of the strap is the centering and leveling means 16.

The centering or leveling means 16 as shown constitutes the preferred construction and employs a conventional bubble type level.

Pivotally mounted on the sides of the U-shaped member is a U-shaped support strip or strap 17 comprised of spring steel or other suitable material. The support 17 is used as an aid in order to firmly position the sideburn gauge assembly on the head of the wearer.

In operation the U-shaped strap 11 is slightly sprung and fitted on the head of the wearer with the support strap 17 being slipped over the back of the head to firmly mount same. The leveling and centering means is thereafter brought into action with the sideburn assembly being moved in order that the bubble may be centered within the designated area (not shown). In this manner the terminal ends are aligned equidistantly from a midpoint at the top of head lying in the medial plane of same.

While the gauge means may be set by manipulating the caps to the predetermined location before the sideburn gauge has been mounted on the head, it may optionaly be set after the mounting on the head.

It will be appreciated that the bottom edge 18 of the cap 14 may be utilized as a line or guide for the cutting of the hair found below the edge.

The instant sideburn gauge assembly may be readily used as an aid to the cutting of sideburns by a barber or by any individual owner.

It will be understood that modifications and variations may be effected without departing from the scope of the novel concepts of the present invention.

I claim as my invention:

In a sideburn gauge, a symmetrical U-shaped member including a curved bight portion arranged to engage over the top of a person's head and a pair of leg portions extending downwardly from and forming smooth continuations of said curved bight portion, identical guide means adjustably extending downwardly from the terminal ends of said leg portions for indicating the sideburn levels, gauge marks for identical positioning of said adjustable guides relative to said leg portions, and means for centering the gauge on a person's head comprising a bubble level device mounted at the center of said curved bight portion, said device including a transparent tube almost filled with liquid and extending along a line exactly parallel to a line through the terminal ends of said leg portions, whereby said guide means are leveled relative to the head by leveling said bubble level device while the person's head is held level.

References Cited in the file of this patent

UNITED STATES PATENTS

| | | |
|---|---|---|
| 1,013,077 | Sharrow | Dec. 26, 1911 |
| 1,091,372 | Mickelson | Mar. 24, 1914 |
| 1,537,783 | Olson | May 12, 1925 |